United States Patent Office 2,971,021
Patented Feb. 7, 1961

2,971,021

1-AMINO-1-CARBOALKOXYCYCLOHEXANES

Edgar S. Schipper, Highland Park, N.J., assignor to Ethicon, Inc., a corporation of New Jersey No Drawing. Filed July 1, 1958, Ser. No. 745,821

16 Claims. (Cl. 260—464)

This invention relates to a new series of organic compounds. More particularly, it relates to certain substituted aminocyclohexanecarboxylates, acid addition salts thereof and methods for their preparation.

The compounds of this invention may be represented by the following general structural formula:

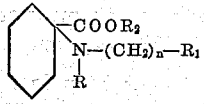

wherein R is a hydrogen atom, a lower alkyl group, for example methyl, ethyl, propyl, isopropyl, butyl, isobutyl, secondary butyl, pentyl, isopentyl, secondary pentyl, hexyl or isohexyl; a mononuclear aryl group, such as phenyl or substituted phenyl, e.g. halophenyl; chlorophenyl, dichlorophenyl, bromophenyl, dibromophenyl, iodophenyl; a lower alkoxy phenyl, e.g. methoxyphenyl, dimethoxyphenyl, trimethoxyphenyl, ethoxyphenyl, diethoxyphenyl, or triethoxyphenyl or an acyl group, e.g. acetyl, propionyl, etc.; benzoyl or substituted benzoyl, e.g. p-methoxybenzoyl, 3,4-dimethoxybenzoyl, 3,4,5-trimethoxybenzoyl, etc. $R_1$ is hydrogen, when R is benzoyl; a mononuclear aryl group such as one of those defined hereinabove for R or a functionally converted carboxyl group such as cyano or carbalkoxy, e.g. carbomethoxy, carbethoxy, carbopropoxy, carbopentoxy; or a dialkylamino substituent such as dimethylamino, diethylamino, methylethylamino, dipropylamino, methylpropylamino, ethylpropylamino, dibutylamino, etc. $R_2$ is a lower hydrocarbon, i.e. lower alkyl, for example methyl, ethyl, propyl, butyl, isobutyl, pentyl, isopentyl and $n$ is a positive integer from 1 to 3.

The compounds of this invention possess pharmacological properties. They affect coronary flow, and are useful as agents for reducing blood pressure. However, aside from their utility as hypotensive agents, the novel compounds may also be employed as intermediates for the preparation of other synthetic medicinal compounds. They can be employed, for example, in the synthesis of tertiary 1-azaspiro-(5,5)-hendecane-5-ones such as those disclosed in my copending application Serial No. 745,-822 filed concurrently herewith, which are useful coronary vasodilators and vasodepressants.

As an example of the utility ascribed to the compounds of the present invention, it may be stated that the novel substituted aminocyclohexanecarboxylates, when subjected to Dieckmann cyclization in the presence of a basic condensing agent such as an alkali metal hydride or alkali metal alkoxide, e.g. sodium hydride, sodium or potassium ethoxide, form the desired tertiary 1-azaspiro-(5,5)-hendecane-5-ones. A specific example of such a compound is 1-methyl-4-carbethoxy-1-azaspiro-(5,5)-hendecane-5-one.

In accordance with one embodiment of my process, the corresponding aminocyclohexanecarboxylate is alkylated with an appropriate functionally converted halogenated hydrocarbon, e.g. a gamma-bromobutyro derivative, i.e. either the ester or the nitrile, in the presence of an alkali metal bicarbonate or carbonate, e.g. potassium or sodium carbonate and preferably in an inert organic solvent medium, such as an alkanol, for example methyl or ethyl alcohol. The starting materials used in the preparation of the compounds of this invention, e.g. lower alkyl 1-aminocyclohexanecarboxylates are obtained by esterification of the corresponding carboxylic acids with a lower alkanol, e.g. methanol, ethanol, propanol and preferably in the presence of gaseous hydrogen chloride. The carboxylic acids in turn are obtainable from the corresponding carboxamides by hydrolysis of the amide with a strong mineral acid, such as hydrochloric acid, sulfuric and/or phosphoric acid. The carboxamides, their properties and preparation, are fully described in my copending United States application Serial No. 745,845 filed concurrently herewith and now abandoned.

Depending on the conditions used, the new compounds may be obtained either in the form of their free bases or as salts. The salts are convertible to the free bases in the usual manner, e.g. by reaction with an alkali metal hydroxide such as sodium or potassium hydroxide. The free bases may be converted to their useful acid addition salts by reaction with the appropriate inorganic or organic acids, such as those given below, for example in an alcoholic, e.g. methanolic, ethanolic or ethereal solution or in a mixture of such solvents.

Salts of the compounds of this invention are acid addition salts, such as those with inorganic acids, for example hydrohalic acids, e.g. hydrochloric or hydrobromic acid, thiocyanic acid, sulfuric or phosphoric acid or those with organic acids, such as acetic, propionic, glycolic, lactic, maleic, fumaric, malic, tartaric, citric, salicylic, para-amino salicylic, 2-phenoxy benzoic or 2-acetoxy benzoic.

If the new compounds of this invention are to be used as medicaments, they may be incorporated into suitable pharmaceutical carriers either in the form of their bases or salts. The carrier may be either an organic or inorganic solid or liquid suitable for oral or parenteral administration. Inert substances which are suitable as carriers are water, gelatin, lactose, starch, magnesium stearate, talc, vegetable oils, benzyl alcohols, gums, polyalkylene gylcols, and similar substances known to those skilled in the art. The preparations may be in the form of tablets or in liquid form in solutions or emulsions.

The following examples are given to illustrate, but not to limit, the scope of the present invention.

*Example I*

To a cooled and stirred solution containing 196 parts by weight of cyclohexanone, 200 parts by volume of methanol, 134 parts by weight of methylamine hydrochloride and 250 parts by volume of water is added a solution of 130 parts by weight of potassium cyanide and 250 parts by volume of water. Considerable heat evolves at the outset. Stirring is continued for 24 hours at room temperature and then the solution is refluxed for two hours. The organic layer is separated, and the aqueous layer is extracted with ether and then with chloroform. The ether extract is added to the original organic layer and the combined layers are washed, as is the chloroform layer. All washed organic layers are combined and dried over sodium sulfate. After removal of the solvents, 1-methylaminocyclohexane carbonitrile distils at 70–71° C./2.2 mm. The hydrochloride is prepared by passing hydrogen chloride into a cold ethereal solution of 1-methylaminocyclohexane carbonitrile. The salt melts upon recrystallization from the ether alcohol at 113–114° C.

A solution of 15 parts by weight of 1-methylaminocyclohexane carbonitrile hydrochloride in 100 parts by volume of 50% sulfuric acid is refluxed for three hours. A slight excess of barium carbonate is added and the mixture is heated and stirred at 100° C. until all the ammonia is given off. The hot suspension is filtered and washed well with hot water. The filtrate is evaporated to dryness leaving 13 parts by weight of the crude amino acid. It is suspended in 100 parts by volume of absolute ethanol and the suspension is cooled in an ice bath and saturated with gaseous hydrogen chloride. The mixture is allowed to stand overnight at room temperature and then refluxed for 4 hours. After removal of the excess ethanol and hydrogen chloride under reduced pressure, the dry residue is taken up with 250 parts by volume of water and filtered. The filtrate is layered with 250 parts by volume of ether and neutralized with a cold concentrated solution of potassium hydroxide. The basic layer is extracted immediately into the ether layer, which is then washed with water and dried. After removal of the drying agent and of the ether, the residue is distilled at 0.05 mm. pressure to give ethyl 1-methylaminocyclohexanecarboxylate, boiling point 44–46° C.

A mixture of 37 parts by weight of ethyl 1-methylaminocyclohexanecarboxylate, 50 parts by weight of ethyl gamma-bromobutyrate and 28 parts by weight of powdered anhydrous potassium carbonate is stirred and heated at 105° C. for 36 hours. The solids are dissolved in 200 parts by volume of ice water and the organic layers are combined and dried over sodium sulfate. After removal of the drying agent and the solvents, the residue is distilled under reduced pressure. After a small forerun, the major fraction, ethyl 1-N-methyl-N-gamma-carbethoxypropylaminocyclohexanecarboxylate boils at 125–130° C./0.05 mm.

Example II

To a cooled and stirred solution containing 196 parts by weight of cyclohexanone, 200 parts by volume of methanol, 378 parts by weight of beta-diethylaminoethylamine dihydrochloride, and 250 parts by volume of water is added a solution of 260 parts by weight of potassium cyanide in 250 parts by volume of water. Considerable heat evolves at the outset. Stirring is continued for 24 hours at room temperature and then the solution is refluxed for two hours. The organic layer is separated and the aqueous layer is extracted with ether and then with chloroform. The ether extract is added to the original organic layer and the combined layers are washed, as is the chloroform layer. All washed organic layers are combined and dried over sodium sulfate. After removal of the solvents, 1 - beta - diethylaminoethylaminocyclohexane carbonitrile distils at 120–122° C./3 mm.

To a cooled and stirred solution containing 100 parts by volume of concentrated sulfuric acid is added dropwise 30 parts by weight of 1-beta-diethylaminoethylaminocyclohexane carbonitrile. The mixture is heated on a steam bath for one hour and then poured into 1 kilogram of ice. The mixture is basified with concentrated ammonia and extracted with 1000 parts by volume of chloroform to give 1-beta-diethylaminoethylcyclohexane carboxamide which is recrystallized at −30° C. from pentane, melting point 69–70° C.

A solution containing 27.5 parts by weight of 1-beta-diethylaminoethylcyclohexane carboxamide and 150 parts by volume of concentrated hydrochloric acid was stirred and refluxed for 8 hours. The mixture was filtered, and the filtrate was evaporated to dryness. The solid residue was combined with the original precipitate and the combined solids were dissolved in 150 parts by volume of absolute ethanol saturated at 0° C. with gaseous hydrogen chloride. The reaction mixture was refluxed for 48 hours. The solvent was removed under reduced pressure, and the residue was dissolved in 20 parts by volume of water. The solution was basified with 20% potassium hydroxide and the oil was ether-extracted. The ether extract was dried and the ether was removed. The resulting ethyl 1-beta-diethylaminoethylaminocyclohexane-carboxylate distils at 90–94° C./0.05 mm. The dihydrochloride, after several recrystallizations from ethanol-ethyl acetate mixtures, melts at 182–184° C.

Example III

To a stirred solution containing 10 parts by volume of pyridine, 50 parts by volume of chloroform, 9.2 parts by weight of ethyl 1-N-methylaminocyclohexanecarboxylate (supra) is added dropwise to a solution containing 10 parts by weight of benzoyl chloride and 10 parts by volume of chloroform while the temperature is maintained at 10° C. The solution is refluxed for two hours and the solvents are removed under reduced pressure. The residue is taken up in benzene and the solution is washed with dilute hydrochloric acid and water. After drying and removal of the solvent, the material is distilled at 0.05 mm. pressure. The boiling point range is very large, and the distillate contains some benzoic acid. The total distillate is dissolved in ether and the solution is washed with potassium carbonate and water. After drying and removal of the ether, there remains a slowly-solidifying material. After several recrystallizations from pentane, the substance, ethyl 1 - N - methyl - N - benzoylaminocyclohexanecarboxylate melts at 62–63° C.

Example IV

A mixture of 37 parts by weight of ethyl 1-methylaminocyclohexanecarboxylate, 30 parts by volume of ethyl bromoacetate and 28 parts by weight of anhydrous powdered potassium carbonate is stirred and heated on a steam bath for 48 hours and then is stirred at room temperature for 2 more hours. After allowing the suspension to stand overnight, the salt is dissolved by addition of 50 parts by volume of ice water and the oil is extracted with three 100-part-by-volume portions of ether. After drying of the ether solution, it is distilled under reduced pressure. After some forerun, ethyl 1-N - methyl - N - carbethoxymethylaminocyclohexanecarboxylate distils at 108–109° C./0.06 mm.

Example V

A mixture of 2.5 parts by weight of ethyl 1-methylaminocyclohexanecarboxylate, 2 parts by weight of gamma-butyronitrile, and 1.86 parts by weight of anhydrous powdered potassium carbonate is stirred and heated on a steam bath for 1 hour, and then is stirred at room temperature for 2 more hours. After allowing the suspension to stand overnight, the salt is dissolved by addition of 50 parts by volume of ice water and the oil is extracted with three 100-part-by-volume portions of ether. After drying of the ether solution, it is distilled under reduced pressure. After some forerun, ethyl 1-N-methyl-N-gamma-cyanopropylaminocyclohexane carboxylate distils at 122–125° C./0.05 mm.

Example VI

A mixture of 17.1 parts by weight of ethyl 1-aminocyclohexanecarboxylate, 15 parts by weight of gamma-butyronitrile and 186 parts by weight of anhydrous powdered potassium carbonate is stirred and heated on a steam bath for one hour and then is stirred at room temperature for two more hours. After allowing the suspension to stand overnight, the salt is dissolved by addition of 50 parts by volume of ice water and the oil is extracted with three 100-part-by-volume portions of ether. After drying of the ether solution, it is distilled under reduced pressure. After some forerun, ethyl 1-N-gamma-cyanopropylaminocyclohexanecarboxylate distils at 136–139° C./0.8 mm.

Example VII

A mixture of 8.55 parts by weight of ethyl 1-amino-cyclohexanecarboxylate, 9.5 parts by weight of ethyl gammabromobutyrate and 6.91 parts by weight of anhydrous powdered potassium carbonate is stirred and heated on a steam bath for one hour, and then is stirred at room temperature for two more hours. After allowing the suspension to stand overnight, the salt is dissolved by addition of 50 parts by volume of ice water and the oil is extracted with three 100-part-by-volume portions of ether. After drying of the ether solution, it is distilled under reduced pressure. After a forerun at 44° C., ethyl 1-N-gamma-carbethoxy-propylaminocyclohexanecarboxylate distils at 104–106° C./0.05 mm. A portion (0.5 part by weight) is dissolved in 20 parts by volume of absolute ether and gaseous hydrogen chloride is passed into the solution. The ether is evaporated, and the residual oil is recrystallized several times from absolute ether to give ethyl 1-N-gamma - carbethoxypropylaminocyclohexanecarboxylate hydrochloride, melting at 140–142° C.

A mixture of 3.6 parts by weight of ethyl 1-N-gamma-carbethoxypropylaminocyclohexanecarboxylate, 2.82 parts by weight of benzoyl chloride, and 10 parts by weight of dry benzene are refluxed for two hours. Two parts by volume of ethanol are added and refluxing is continued for two more hours. The solution is washed with two 25-part-by-volume portions of a 10% potassium hydroxide solution, two 25-part-by-volume portions of 10% hydrochloric acid, and with two 50-milliliter portions of a saturated potassium carbonate solution. The organic layer is dried and the solvent is removed to yield five parts by weight of the viscous residue. A portion of it is subjected to distillation in the molecular still set up. After a forerun of ethyl benzoate, the major portion, ethyl 1-N-benzoyl - N - gamma-carbethoxypropylaminocyclohexanecarboxylate distils at an outside temperature of 200–205° C./0.05 mm.

*Example VIII*

To a cooled and stirred solution containing 196 parts by weight of cyclohexanone, 200 parts by volume of ethanol, 259 parts by weight of benzylamine hydrochloride and 250 parts by volume of water is added a solution of 130 parts by weight of potassium cyanide and 250 parts by volume of water. Considerable heat evolves at the outset. Stirring is continued for 24 hours at room temperature and the solution is refluxed for two hours. The organic layer is separated and the aqueous layer is extracted with ether and then with chloroform. The ether extract is added to the original organic layer, and the combined layers are washed, as is the chloroform layer. All washed organic layers are combined and dried over sodium sulfate. The product, 1-benzylaminocyclohexane carbonitrile is converted to the hydrochloride which melts at 134–135° C.

To a cooled and stirred solution of 100 parts by volume of concentrated sulfuric acid is added dropwise 30 parts by weight of 1-benzylaminocyclohexane carbonitrile. The mixture is heated and stirred for 1 hour at 100° C., and then poured into 1 kilogram of ice. The solution is neutralized with a concentrated solution of potassium hydroxide whereupon the product, 1-benzylaminocyclohexane carboxamide, precipitates out, is filtered and recrystallized from heptane. Melting point 106–107° C.

A solution containing 76.5 parts by weight of 1-benzylaminocyclohexane carboxamide and 500 parts by volume of concentrated hydrochloric acid is stirred and refluxed for 8 hours. The mixture is filtered and the filtrate is evaporated to dryness. The solid residue is combined with the original precipitate and the combined solids are dissolved in 150 parts by volume of absolute ethanol saturated at 0° C. with gaseous hydrogen chloride. The reaction mixture is refluxed for 48 hours. The solvent is removed under reduced pressure and the residue is dissolved in 20 parts by volume of water. The solution is basified with 20% potassium hydroxide and the oil is ether extracted. The ether extract is dried and the ether is removed. The resulting ethyl 1-benzylaminocyclohexanecarboxylate distils at 109–114° C./0.06 mm. The hydrochloride, after recrystallization from ethyl acetate, melts at 176–178° C.

What is claimed is:
1. A member selected from the group consisting of compounds having the general formula:

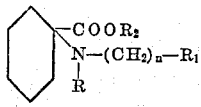

wherein R is a member selected from the group consisting of lower alkyl, benzoyl and hydrogen; $R_1$ is a member selected from the group consisting of cyano, carb-lower alkoxy, di-lower alkylamino, phenyl; $R_2$ is lower alkyl; $n$ is a positive integer from 1 to 3, and therapeutically active acid addition salts thereof.

2. Lower alkyl 1-N-lower alkyl-N-carbalkoxy lower alkyleneaminocyclohexane carboxylate.

3. Lower alkyl 1-dialkylaminoalkylaminocyclohexanecarboxylate.

4. Lower alkyl 1-N-lower alkyl-N-acylaminocyclohexanecarboxylate.

5. Lower alkyl 1-N-lower alkyl-N-gamma-cyanoalkylaminocyclohexane carboxylate.

6. Lower alkyl 1-gamma-cyanopropylaminocyclohexanecarboxylate.

7. Lower alkyl 1-aralkylaminocyclohexanecarboxylate.

8. Ethyl 1 - N - methyl - N - gamma - carbethoxypropylaminocyclohexanecarboxylate.

9. Ethyl 1-benzylaminocyclohexanecarboxylate.

10. Ethyl 1 - N - ethyl - N - benzoylaminocyclohexanecarboxylate.

11. Ethyl 1 - N - benzoyl - N - gamma - carbethoxypropylaminocyclohexanecarboxylate.

12. Ethyl 1 - N-methyl - N - benzoylaminocyclohexanecarboxylate.

13. Ethyl 1-N-methyl-N-gamma-cyanopropylaminocyclohexanecarboxylate

14. Ethyl 1-gamma-carbethoxypropylaminocyclohexanecarboxylate.

15. Ethyl 1-gamma-cyanopropylaminocyclohexanecarboxylate.

16. Ethyl 1 - diethylaminoethylaminocyclohexanecarboxylate.

References Cited in the file of this patent

Betts et al.: J. Chem. Soc. (Lon.), 2070–4 (1928).
Adkins et al.: J. Am. Chem. Soc., 70, 3122 (1948).